United States Patent Office 2,959,328
Patented Nov. 8, 1960

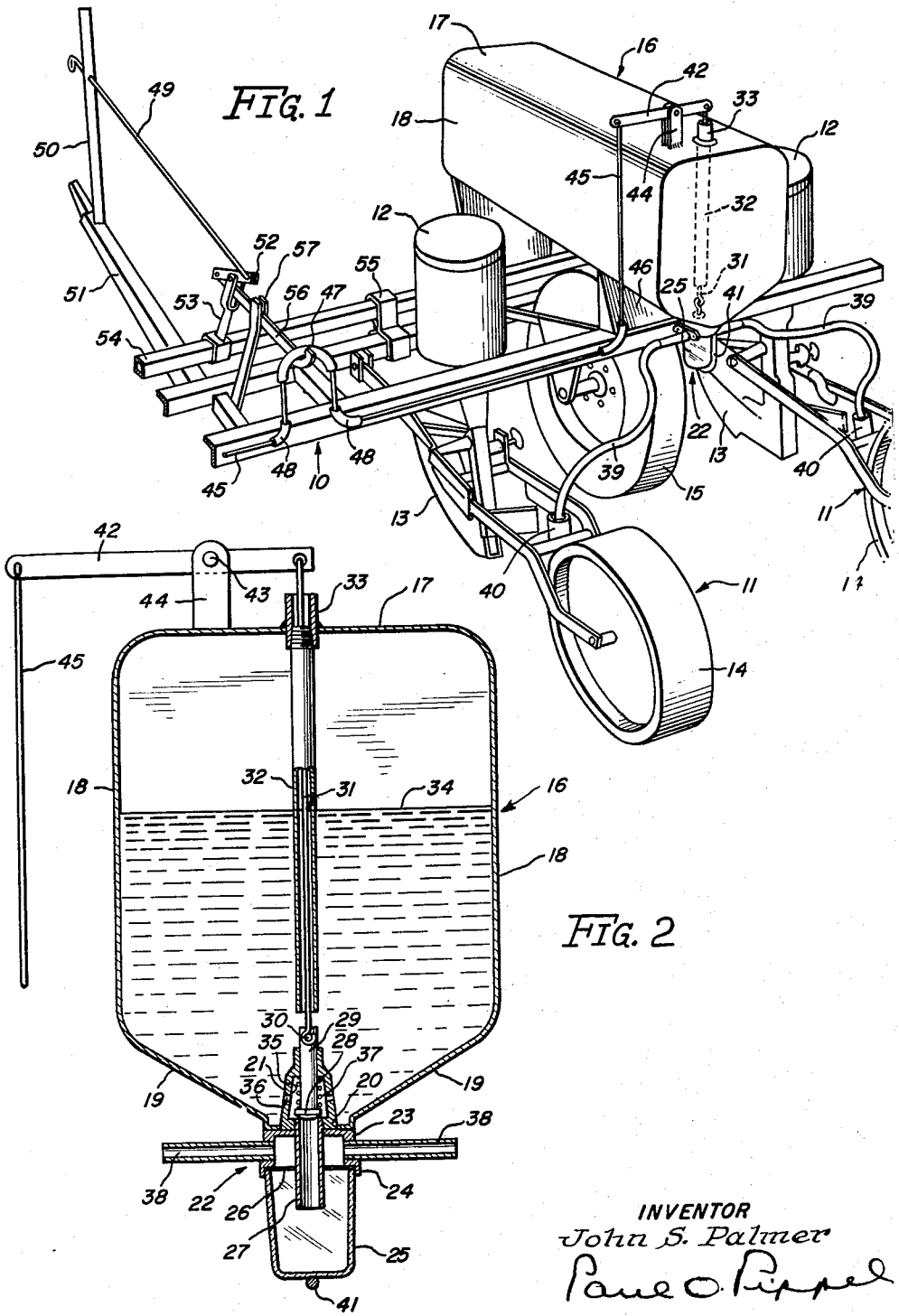

2,959,328

CONTROL FOR LIQUID DISPENSER

John S. Palmer, East Moline, Ill., assignor to International Harvester Company, Chicago, Ill., a corporation of New Jersey Filed Mar. 11, 1959, Ser. No. 798,750

4 Claims. (Cl. 222—176)

This invention relates to agricultural implements and particularly to material dispensers. More specifically the invention concerns a liquid fertilizer distributing attachment for planters and the like.

When liquid fertilizer for agricultural purposes is contained in tanks mounted on a traveling support and is discharged by gravity for distribution to the various furrow openers to be dropped in the furrows formed thereby, it is important that the stream of fertilizer be uniform, and therefore there should be nothing to interfere with the controlled flow of the liquid. With the complicated and inefficient valve control systems used in the past, this uniformity has not been achieved.

It is also important that the fertilizer be discharged only when the furrow openers are in the ground and that discharge be discontinued when the implement is raised, as when turning at the end of a field, whether such control be automatic or manual. It is therefore important that the mechanism which opens and closes the valve controlling the flow of fluid from the tank be free from unnecessary complications, both from the standpoint of economy and efficiency, and an object of the invention is the provision of novel, simple and efficient control means for dispensing liquid fertilizer and the like.

Another object of the invention is the provision of improved means for controlling, from the inside, the discharge of liquid fertilizer and the like by gravity through a valve in the bottom of a tank, wherein the valve actuating mechanism is inside the tank, eliminating the need for sealing means and the likelihood of leakage of liquid from the tank.

Another object of the invention is the provision, in a liquid fertilizer distributor adapted for attachment to planters and the like wherein fluid is discharged by gravity through a valve in the bottom of the tank, of novel means combining a breather tube for the tank with an unobstructed rod extending from outside the tank through the tube to a connection with a valve actuating stem, the size of the rod with respect to the diameter of the tube being so small as to be ineffective to prevent the free flow of air through the tube into the tank.

Other objects and advantages of the invention will become clear from the following detailed description when read in conjunction with the accompanying drawings, wherein:

Figure 1 is a view in perspective of a portion of a planter having a liquid fertilizer attachment mounted thereon and incorporating the features of this invention, parts of the planter being eliminated for clarity, and Figure 2 is an enlarged sectional detail of the fertilizer container showing the means for opening and closing the discharge valve.

The invention is illustrated in its application to a liquid fertilizer attachment for a multi-row planter comprising a transversely extending generally rectangular frame 10 upon which is mounted a plurality of laterally spaced planter units 11, which it may be understood are of conventional form and comprise seed receptacles 12, furrow openers 13 and press wheels 14. The planter frame 10 is supported at each end by a wheel 15.

A single tank or container 16 is shown in the drawings mounted upon the frame 10, and is adapted to supply liquid fertilizer to the furrows formed by the earth-working tools 13 of adjacent planter units 11. It may be understood that a tank 16 is provided for each pair of planter units mounted on the planter frame. As shown in Figure 2, the tank is generally rectangular in section having a top 17, sides 18 and downwardly converging bottom walls 19 having an opening 20 therein adapted to receive the housing 21 of a valve assembly 22, housing 21 forming part of a cap 23 adapted to cover the opening 20 and having an annular lip 24 at its lower end.

Lip 24 is adapted to fit over the upper end of a transparent glass cup 25 and a filter screen 26 of any suitable filtering material. Screen 26 has a central opening to receive a pipe 27, the lower end of which projects downwardly into the cup 25 and the upper end of which passes through an opening in cap 23 and is threaded for reception in a threaded opening in the base of housing 21.

The upper end of pipe 27 serves as a valve seat engageable by a valve closure member 28 carried at the lower end of a valve stem 29 extending vertically and slidable in the housing 21.

The upper end of valve stem 29 projecting out of the housing 21 is pivotally connected by a pin 30 to the lower end of a rod 31 in the form of a link of heavy wire extending vertically upwardly through a tube 32, the upper end of which is threaded for reception in a cylindrical member 33 penetrating the top 17 of receptacle 16 and affixed thereto, as by welding. The lower end of cylindrical member 33 is threaded to receive the upper end of tube 32 and to hold the latter firmly. As shown in Figure 2, tube 32 penetrates the liquid 34 in the tank and extends to a location near the bottom adjacent valve 22 in alignment with valve stem 29. Tube 32 functions as a breather tube to allow flow of outside air from the top side of the tank through the tube to maintain a nearly constant pressure of the liquid through valve 22. It will also be noted that the inner diameter of tube 32 is considerably greater than the diameter of the rod 31 so that the latter does not interfere with the free passage of air in the tube.

Liquid flowing into valve chamber 35 through openings 36 in the housing 21 flows through pipe 27, when valve closure 28 is raised by upward movement of rod 31 against the action of a spring 37 surrounding stem 29 and engaging the closure 28 to urge it to closed position.

Fluid received in cup 25 passes through the filter screen 26 and is discharged laterally through pipes 38, threaded for reception in openings provided in cap 23. Flexible hoses 39 are connected to the ends of pipes 38 and conduct the fluid to a vertical conduit 40 carried by the planter unit 11 from which the fluid is discharged into the furrow formed by the furrow openers 13. The cup 25 and screen 26 are readily removed for cleaning, and are held in place on cap 23 by a suitable clamping means such as indicated at 41.

The combination of the breather tube 32 with control rod 31 provides a simple and economical means of controlling the operation of valve 22. Rod 31 moves unobstructed in tube 32 and the upper end thereof is pivotally connected to one end of a horizontal lever 42 fulcrumed at 43 between a pair of lugs 44 affixed to and projecting upwardly from the top 17 of container 16. The other end of lever 42 projecting laterally beyond the tank is pivotally connected to the end of a flexible cable 45 which extends downwardly and laterally through a curved tube 46 secured to the planter frame. The cable 45 is preferably continuous and forms a loop through a protective tube 47 and a pair of tubes 48 secured to the frame. It may be understood that the portion of cable 45 beyond the left hand tube 48 shown in Figure 1 continues and actuates the control mechanism for another fertilizer tank 16, not shown, adapted to dispense fertilizer to another pair of planter units 11, also not shown, but mounted on the planter frame 10.

It should now be understood that by pulling upwardly on the loop of cable 45 contained in tube 47, lever 42 is rocked in a counterclockwise direction about the pivot point 43 as viewed in Figure 2, to lift the valve closure 28 and allow fluid to flow to the planter units 11.

The planter is adapted to be propelled by a tractor or the like and control means are provided within reach of the tractor operator for opening and closing valve 22. The control means shown in the drawings is manual and comprises a rod 49 supported by an upright 50 secured to the implement drawbar 51. The rod 49 is slidable in an opening provided in the support 50 and the rear end of the rod is pivotally connected to the rear end of a bar 52 which in turn is pivotally mounted centrally thereof in the bifurcated upper end of a rock arm 53 mounted on a transverse rockshaft 54 rockably carried in brackets 55 mounted on the planter frame. The forward end of bar 52 is pivotally connected to one end of a bar 56 pivotally connected centrally thereof to a support 57 mounted on the frame. The rear end of bar 56 is curved upwardly to form a hook and supports the loop of the flexible cable 45 carried in the tube 47.

Although the construction and operation of the control rod 49 and its connection to bar 56 form no part of this invention, it may be understood that a forward pull on rod 49 by the operator of the propelling tractor rocks bar 52 and therefore bar 56 in a direction to cause the rear end of bar 56 to rise and swing lever 42 in a counterclockwise direction about its pivot 43 to open the valve 22 and allow fluid to discharge. Of course, a rearward push upon rod 49 closes the valve and cuts off the flow of fertilizer.

It is believed that the novel control mechanism for the fertilizer dispensing apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a distributor for liquid fertilizer and the like including a mobile frame and a container mounted on the frame, said container having alined openings in the top and bottom thereof, a breather tube having one end secured to the top of the container over the associated opening and extending downwardly into the container to a location adjacent and spaced from said lower opening to accommodate passage of air through said tube, a rod extending slidably through said breather tube and of substantially smaller diameter so as not to interfere with the flow of air through said tube, a valve in the bottom opening in said container connected to said rod, and means outside the container operatively connected to the upper end of said rod for reciprocating the latter in the tube to open and close said valve.

2. In a distributor for liquid fertilizer and the like including a mobile frame and a container mounted on the frame, said container having alined openings in the top and bottom thereof, a breather tube having one end secured to the top of the container over the opening therein and extending downwardly into the container to a location adjacent and spaced from said lower opening to accommodate passage of air through said tube, a rod extending slidably through said breather tube and of smaller diameter so as not to interfere with the flow of air through said tube, a valve seated in said bottom opening in the container to control the flow of fertilizer therethrough, said valve having a stem vertically slidable to open and close the valve, means pivotally connecting the lower end of the rod to said valve stem, and means outside the container for reciprocating the rod in said breather tube to open and close the valve comprising a generally horizontal lever pivotally mounted on the container for generally vertical swinging of one end thereof, and means pivotally connecting said one end to the upper end of said rod for reciprocating the latter upon rocking said lever.

3. In a distributor for liquid fertilizer and the like including a mobile frame and a container mounted on the frame, said container having openings in the top and bottom thereof, a breather tube having one end secured to the top of the container over the opening therein and extending downwardly into the container to a location spaced from said bottom opening to accommodate passage of air through said tube, a rod extending slidably through said breather tube and of smaller diameter so as not to interfere with the flow of air through the tube, a valve assembly comprising a housing seated in the bottom opening in the container and enclosing a valve chamber, said housing having openings therein within the container to allow flow of liquid into said chamber, said housing having a valve opening therein for the discharge of liquid from the valve chamber to the outside of the container, a valve closure member adapted to close said valve opening, and means connecting the lower end of said rod to said closure member.

4. In a distributor for liquid fertilizer and the like including a mobile frame and a container mounted on the frame, said container having openings in the top and bottom thereof, a breather tube having one end secured to the top of the container over the opening therein and extending downwardly into the container to a location spaced from said bottom opening to accommodate passage of air through said tube, a rod extending slidably through said breather tube and of smaller diameter so as not to interfere with the flow of air through the tube, a valve assembly comprising a housing seated in the bottom opening in the container and enclosing a valve chamber, said housing having openings therein within the container to allow flow of liquid into said chamber, said housing having a valve opening therein for the discharge of liquid from the valve chamber to the outside of the container, a valve closure member adapted to close said valve opening, means connecting the lower end of said rod to said closure member, and means outside the container operatively connected to said rod for reciprocating the latter in said tube to open and close said valve.

References Cited in the file of this patent
UNITED STATES PATENTS

| | | |
|---|---|---|
| 176,782 | Greiner | May 2, 1876 |
| 220,682 | Thayer | Oct. 14, 1879 |
| 524,900 | James | Aug. 21, 1894 |
| 586,855 | Martindale | July 20, 1897 |
| 2,587,085 | Anderson | Feb. 26, 1952 |